(12) United States Patent
Boileau et al.

(10) Patent No.: US 10,641,206 B2
(45) Date of Patent: May 5, 2020

(54) NACELLE REAR ASSEMBLY FOR A TURBOJET ENGINE COMPRISING A CRADLE FOR A CORE-TYPE MAST

(71) Applicant: SAFRAN NACELLES, Gonfreville l'Orcher (FR)

(72) Inventors: Patrick Boileau, Tournefeuille (FR); Olivier Kerbler, Antony (FR); Julien Lezerac, Toulouse (FR); Armel Gautier, Negrepelisse (FR); Loïc Grall, Elancourt (FR); Ludovic Toupet, Alfortville (FR)

(73) Assignee: SAFRAN NACELLES, Gonfreville l'Orcher (FR)

( * ) Notice: Subject to any disclaimer, the term of this patent is extended or adjusted under 35 U.S.C. 154(b) by 309 days.

(21) Appl. No.: 15/654,030

(22) Filed: Jul. 19, 2017

(65) Prior Publication Data
US 2017/0321633 A1 Nov. 9, 2017

Related U.S. Application Data

(63) Continuation of application No. PCT/FR2016/050122, filed on Jan. 21, 2016.

(30) Foreign Application Priority Data

Jan. 21, 2015 (FR) ...................................... 15 50491

(51) Int. Cl.
*F02K 1/72* (2006.01)
*B64D 29/06* (2006.01)
(Continued)

(52) U.S. Cl.
CPC ................ *F02K 1/72* (2013.01); *B64D 27/16* (2013.01); *B64D 27/26* (2013.01); *B64D 29/06* (2013.01);
(Continued)

(58) Field of Classification Search
CPC ... F02K 1/72; F02K 1/80; F02K 1/625; F02K 1/62; F02K 1/70; B64D 2027/262;
(Continued)

(56) References Cited

U.S. PATENT DOCUMENTS 3,503,211 A * 3/1970 Holman .................... F02K 1/72
60/229
4,442,987 A * 4/1984 Legrand ................. B64D 29/08
239/265.25

(Continued)

FOREIGN PATENT DOCUMENTS

EP 1286037 2/2003
EP 2690018 1/2014
(Continued)

OTHER PUBLICATIONS

International Search Report for International Application PCT/FR2016/050122, dated May 4, 2016.

*Primary Examiner* — Andrew H Nguyen
(74) *Attorney, Agent, or Firm* — Burris Law, PLLC

(57) ABSTRACT

The present disclosure provides a nacelle rear assembly for turbojet engine including at least one thrust reverser device to redirect air flow circulating from upstream to downstream in a flow path of the turbojet engine and a mast to link the nacelle to a structure of the aircraft. In one form, the nacelle extends longitudinally from forth to back along an axis and includes a cradle fastened on the mast. In one form, the cradle includes a first longeron and a second longeron extending longitudinally on either side of the mast. The first and second longeron each include a sliding guide device for sliding of a movable cowl and of a cascade of the thrust reverser device.

11 Claims, 2 Drawing Sheets

(51) Int. Cl.
  *F02C 7/20* (2006.01)
  *B64D 27/26* (2006.01)
  *B64D 27/16* (2006.01)
  *F01D 25/24* (2006.01)

(52) U.S. Cl.
  CPC ............... *F01D 25/24* (2013.01); *F02C 7/20* (2013.01); *B64D 2027/264* (2013.01); *F05D 2220/323* (2013.01); *F05D 2260/50* (2013.01)

(58) Field of Classification Search
  CPC ........ B64D 2027/264; B64D 2027/266; B64D 27/10; B64D 27/12; B64D 29/06
  See application file for complete search history.

(56) References Cited

U.S. PATENT DOCUMENTS

| | | | | |
|---|---|---|---|---|
| 8,316,632 | B2* | 11/2012 | West | F02K 1/32 60/226.2 |
| 2002/0172593 | A1* | 11/2002 | Udall | B64D 27/16 415/126 |
| 2010/0107599 | A1* | 5/2010 | Vauchel | B64D 29/08 60/226.2 |
| 2012/0124963 | A1* | 5/2012 | Howe | A63F 13/12 60/204 |
| 2014/0027537 | A1* | 1/2014 | Binks | F02K 1/09 239/265.35 |
| 2014/0027602 | A1* | 1/2014 | Layland | B64D 27/26 248/554 |
| 2015/0122943 | A1* | 5/2015 | Wu | F02K 1/72 244/54 |
| 2016/0169158 | A9* | 6/2016 | Ramlaoui | F02K 1/763 239/265.19 |

FOREIGN PATENT DOCUMENTS

| | | |
|---|---|---|
| FR | 2911372 | 7/2008 |
| FR | 2952681 | 5/2011 |
| FR | 2966882 | 5/2012 |
| FR | 2995637 | 3/2014 |
| FR | 3002785 | 9/2014 |
| WO | 2013038093 | 3/2013 |
| WO | 2014123595 | 8/2014 |
| WO | 2014132011 | 9/2014 |

* cited by examiner

NACELLE REAR ASSEMBLY FOR A TURBOJET ENGINE COMPRISING A CRADLE FOR A CORE-TYPE MAST

CROSS-REFERENCE TO RELATED APPLICATIONS

This application is a continuation of International Application No. PCT/FR2016/050122, filed on Jan. 21, 2016, which claims priority to and the benefit of FR 15/50491 filed on Jan. 21, 2015. The disclosures of the above applications are incorporated herein by reference.

FIELD

The present disclosure relates to a nacelle rear assembly for a turbojet engine.

BACKGROUND

The statements in this section merely provide background information related to the present disclosure and may not constitute prior art.

In general, an aircraft is moved by several turbojet engines each housed in a nacelle accommodating a set of auxiliary actuating devices relating to its operation and providing various functions when the turbojet engine is in operation or shut-down.

In particular, these auxiliary actuating devices comprise a thrust reverser system.

In general, a turbojet engine nacelle presents a substantially tubular structure comprising an air inlet upstream of the turbojet engine, a mid-section intended to surround a fan of said turbojet engine, a downstream section intended to surround the combustion chamber of the turbojet engine and possibly integrating thrust reversal means, and is generally terminated by an ejection nozzle whose outlet is located downstream of the turbojet engine.

Modern nacelles are intended to accommodate a bypass turbojet engine capable of generating via the blades of the rotating fan a hot air flow (primary flow) and a cold air flow (secondary flow) which circulates outside the turbojet engine through an annular passage, also called flow path, formed between a fairing of the turbojet engine and an inner wall of the nacelle. The two air flows are ejected from the turbojet engine from the rear of the nacelle.

In general, the downstream section of a nacelle for such a turbojet engine has an Outer Fixed Structure (OFS) and a concentric Inner Fixed Structure (IFS) surrounding a downstream section of the turbojet engine accommodating the gas generator of the turbojet engine.

The inner and outer fixed structures define the flow path intended to channel the cold air flow which circulates outside the turbojet engine.

The role of a thrust reverser, during the landing of an aircraft, is to improve the braking capability of said aircraft by redirecting forwards at least one portion of the air ejected from the turbojet engine. In this phase, the thrust reverser obstructs at least one portion of the flow path of the cold flow and directs this flow forwardly of the nacelle, thereby generating a counter-thrust which is added to the braking of the wheels and air brakes of the aircraft.

In general, the structure of a thrust reverser comprises a cowl which is mounted movable in longitudinal translation from forth to back along a direction substantially parallel to the axis of the nacelle, between a closure position in which the cowl provides the aerodynamic continuity of the nacelle, and an opening position in which the cowl opens a passage in the nacelle.

In the case of a thrust reverser with cascade vanes, the reorientation of the air flow is performed by cascade vanes, associated to reversal flaps blocking at least partially the air flow path, the cowl having a simple sliding function aiming to uncover or cover these cascade vanes.

In turn, the reversal flaps, also called blocking flaps, are activated and driven by sliding of the movable cowl until obstructing at least partially the flow path downstream of the cascades, so as to improve the reorientation of the cold air flow.

There are known nacelles called "O-Duct" nacelles which have a downstream structure having one single substantially peripheral structure extending from one side of the reactor mast up to the other side.

It follows that such a structure generally has one single substantially peripheral cowl which is opened, for maintenance purposes, by downstream translation along the longitudinal axis of the nacelle.

For a detailed description, reference may be made to the documents FR 2 911 372 and FR 2 952 681.

The reactor mast is a means for linking the propulsion unit to the wing of the aircraft, which carries the turbojet engine by front and rear suspensions.

There is known a mast called a "fan casing"-type mast, which includes a front portion fastened on the fan casing of the turbojet engine, in contrast with a mast called a "core"-type mast which is fastened on the core of the turbojet engine, that is to say downstream of the fan casing, for example on the hub of the fan casing or on the hub of the high-pressure compressor of the turbojet engine.

Moreover, the O-Duct nacelles include cascade vanes which are mounted movable in translation and capable of being retracted at least partially through the mid-section of the nacelle and thus overlap the fan casing when the thrust reverser is inactive, in the direct jet position. In the thrust reversal position, the cascade vanes are displaced with the movable cowl.

In the case of a thrust reverser for an O-Duct nacelle, the mast may be equipped with rails allowing the sliding of the movable cowl and of the cascades.

On modern propulsion assemblies, large-sized and having very flexible structures, this configuration may induce considerable stresses in the structure of the thrust reverser.

There is also known a thrust reverser device described in the document FR-A-3002785, which includes rails which are arranged on either side of the mast and which provides the sliding of the movable cowl and of the cascade vanes.

This type of devices has drawbacks in particular in the event of a relative displacement of the turbojet engine relative to the mast, the movable cascades, which are fastened on the mast, might be subjected to distortion forces.

Indeed, in order to limit the volume of modern nacelles, in particular the radial section of the nacelles, the section of the movable cascades is limited in order to reduce their bulk, so that the inertia of the cascades and the mechanical resistance opposed thereby is reduced.

Furthermore, there is also a risk of relative displacement of the rails relative to each other and significant geometric variations which might compromise the proper operation of the kinematics of the thrust reverser.

Finally, the mounting/dismounting of the propulsion unit implies dismounting all or part of the thrust reverser.

Furthermore, the thrust reverser device described in the document FR-A-3002785 is not adapted to a previously described "core"-type mast.

Indeed, the core-type mast has the particularity of including a longitudinal front portion inclined towards the axis of the nacelle so as to be fastened on the core of the turbojet engine.

SUMMARY

The present disclosure provides a nacelle rear assembly for a turbojet engine comprising at least one thrust reverser device by redirection of an air flow circulating from upstream to downstream in a flow path of the turbojet engine and a mast designed to link the nacelle to the structure of the aircraft, the nacelle extending longitudinally from forth to back along an axis, the thrust reverser device comprising at least:

A cowl which is mounted movable in longitudinal translation from forth to back along a direction substantially parallel to the axis of the nacelle, between a closure position in which the cowl provides the aerodynamic continuity of the nacelle, and an opening position in which the cowl opens a passage in the nacelle, and at least one sliding thrust reverser cascade which is driven by the movable cowl, between a stowed position between a fan casing and an outer envelope of the nacelle, corresponding to the closure position of the cowl, and a thrust reversal position corresponding to the opening position of the cowl, in which position the sliding cascade is displaced downstream so as to be able to extend through said passage opened by the cowl, characterized in that the nacelle rear assembly is equipped with a cradle which is fastened on the mast and which includes a first longeron and a second longeron generally extending longitudinally on either side of the mast, each of said longerons carrying a sliding guide device of the movable cowl and of the sliding cascade.

Thus, the rear assembly of a nacelle according to the present disclosure allows the thrust reverser device to follow the movements of the turbojet engine and consequently reduce the stresses transmitted to the thrust reverser.

Advantageously, the cradle according to the present disclosure also allows limiting the movements of the turbojet engine.

According to one variation, the mast has a front section which is linked to the core of the turbo-compressor via a first suspension.

Furthermore, the longerons generally extend longitudinally from the mast forming with the mast an angle of inclination so as to compensate the angle of inclination of the mast plunging towards the core of the turbojet engine, so that the cradle hangs over the mast.

Besides, a rear portion of the cradle includes a first front fastening device on the mast and a second rear fastening device on the mast, said fastening devices being spaced apart longitudinally, and the cradle includes a front portion, forming a suspension, which extends longitudinally in a cantilevered manner beyond said fastening devices.

This feature allows the cradle to act as a suspension to accompany the movements of the turbojet engine.

According to another aspect, the nacelle rear assembly includes at least one transverse cross member which links the first longeron and the second longeron of the cradle to each other transversely and which is designed to provide the transmission of the forces between said longerons.

In one form, the cross member is a connecting rod which includes:

a first pivot linkage mounted in free pivoting on the first longeron about a generally longitudinal axis, and a second pivot linkage mounted in free pivoting on the second longeron about a generally longitudinal axis.

Furthermore, the sliding guide device of the movable cowl and of the sliding cascade include at least:

a first pair of guide rails of the cascade, comprising a first rail and a second rail which are arranged on either side of the mast and which are designed to provide the sliding of the thrust reverser cascade, and a second pair of guide rails of the cowl, comprising a first rail and a second rail which are arranged on either side of the mast and which are designed to provide the sliding of the movable cowl.

According to another form, the first rail of the first pair of guide rails of the cascade and the first rail of the second pair of guide rails of the cowl are aligned on the same straight line, and the second rail of the first pair of guide rails of the cascade and the second rail of the second pair of guide rails of the cowl are aligned on the same straight line.

Advantageously, the first longeron of the cradle includes:

a first linking portion which is delimited laterally by a first longitudinal edge which extends in the vicinity of the mast, and by a second longitudinal edge which carries at least the first guide rail of the cascade, a second linking portion which is delimited laterally by a first longitudinal edge which extends in the vicinity of the mast, and by a second longitudinal edge which carries at least the second guide rail of the cascade.

In one form, each linking portion comprises an opening which is uncovered by the movable cowl in its opening position, in order to enable the redirection of the air flow, said opening being adapted to be completely or partially obstructed as needed.

Advantageously, according to a variant, the nacelle has an inner fixed structure which includes islets linked to the cradle.

Further, the rear assembly of a nacelle includes at least one safety lock for inhibiting an unintended deployment of the movable cowl.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
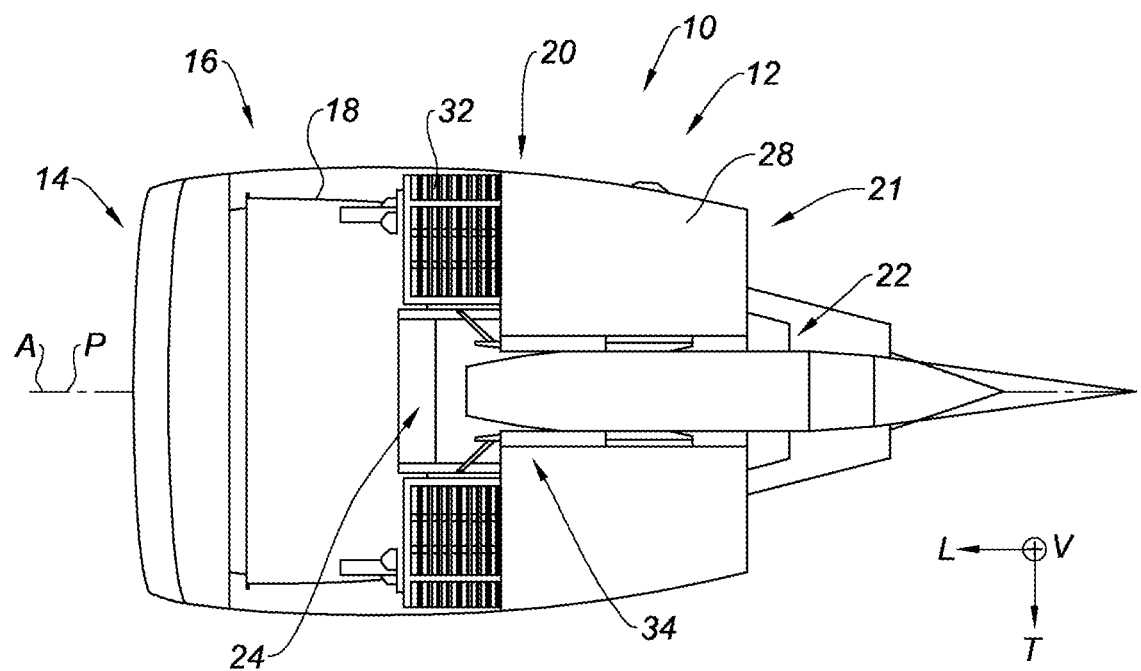
FIG. 1 is a top view illustrating a nacelle equipped with a thrust reverser device including a cradle carrying a cowl represented in the closure position, according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the description and the claims, the expressions "upper", "lower", "bottom", and "top" will be used without limitation with reference respectively to the upper portion and to the lower portion of FIGS. 1 to 4.

Furthermore, in order to clarify the description and the claims, the terms longitudinal, vertical and transverse will be adopted without limitation with reference to the trihedron L, V, T indicated in the figures, whose longitudinal axis L is parallel to the axis of the nacelle.

It is also noteworthy that in the present patent application, the terms "upstream" and "downstream" as used herein should be understood with reference to the circulation of the air flow inside the propulsion unit formed by the nacelle and the turbojet engine, that is to say from the left to the right according to FIGS. 1 to 4.

Also, in order to facilitate the understanding of the present disclosure, the elements that are identical and symmetrical with respect to the plane of symmetry P are indicated by the same reference numerals distinguished by the letter "a" or "b".

In FIG. 1 is represented a rear assembly of a nacelle 12 including a thrust reverser device 10 for a turbojet engine nacelle 12 (not visible) of an aircraft by redirection of an air flow circulating from upstream to downstream in a flow path.

A turbojet engine device as used herein should be construed to include a portion also called "motor" of the propulsion unit formed by the nacelle 12 and the turbojet engine, that is to say the portion which is arranged at a center of the nacelle 12.

The nacelle 12 presents a substantially tubular structure which extends longitudinally along a central axis A and which comprises an air inlet 14 upstream of the turbojet engine, a mid-section 16 intended to surround a fan 18 of the turbojet engine, a downstream section 20 intended to surround a combustion chamber of the turbojet engine and integrating the thrust reverser device 10, and an ejection nozzle 21 whose outlet is located downstream of the turbojet engine.

As visible in FIG. 1, the nacelle 12 is linked to the structure of the aircraft by a mast 22 which carries the turbojet engine by means of a first front suspension (not represented) and a second rear suspension (not represented).

The mast 22 herein is a "core"-type mast, which is fastened on the core of the turbojet engine, that is to say downstream of the fan casing 18, for example on the means of the fan casing (not represented).

Figure 2:
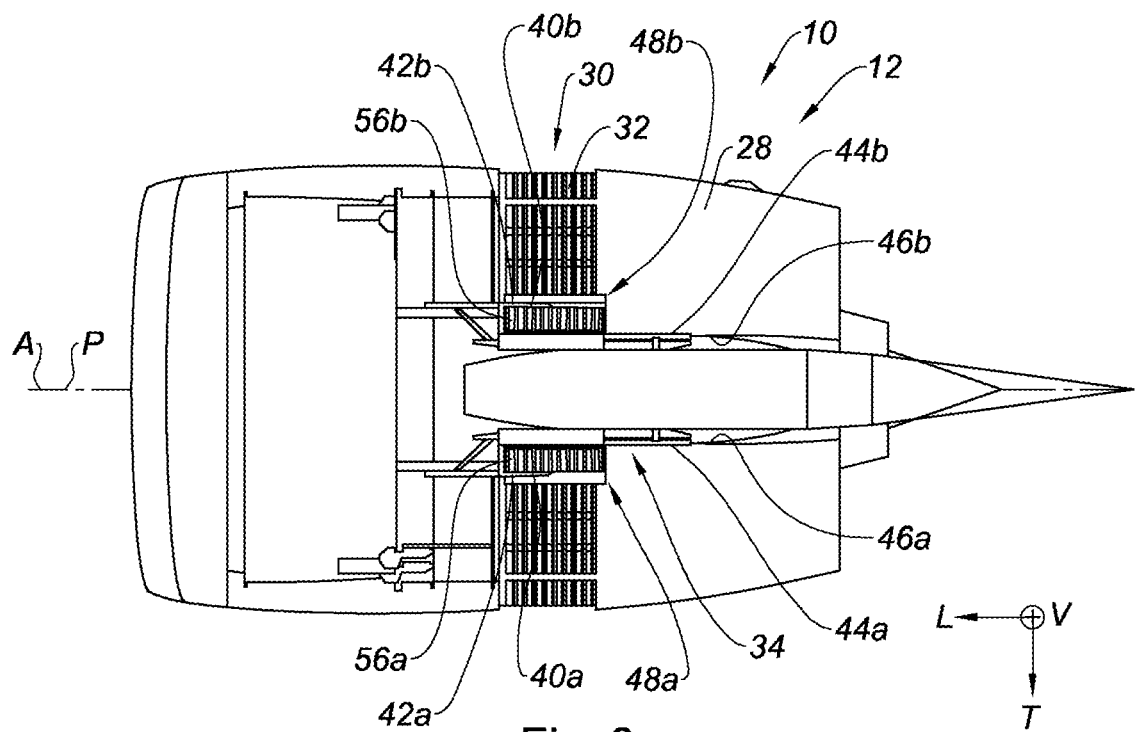
FIG. 2 is top view similar to that of FIG. 1, which illustrates the cowl in the opening position according to the teachings of the present disclosure.

The thrust reverser device 10 comprises a cowl 28 which is mounted movable in longitudinal translation from forth to back along the axis A of the nacelle 12, between a closure position, represented in FIG. 1, in which the cowl 28 provides the aerodynamic continuity of the nacelle 12, and an opening position, represented in FIG. 2, in which the cowl 28 opens a passage 30 for diverting the air flow in the nacelle 12.

Furthermore, the device 10 includes sliding thrust reverser cascades 32 which are driven by the movable cowl 28, between a stowed position between the fan casing 18 and the outer envelope of the nacelle 12, corresponding to the closure position of the cowl 28, and a thrust reversal position corresponding to the opening position of the cowl 28, in which position the sliding cascades 32 are displaced downstream so as to be able to extend through the passage 30 opened by the movable cowl 28 in the nacelle 12.

Figure 4:
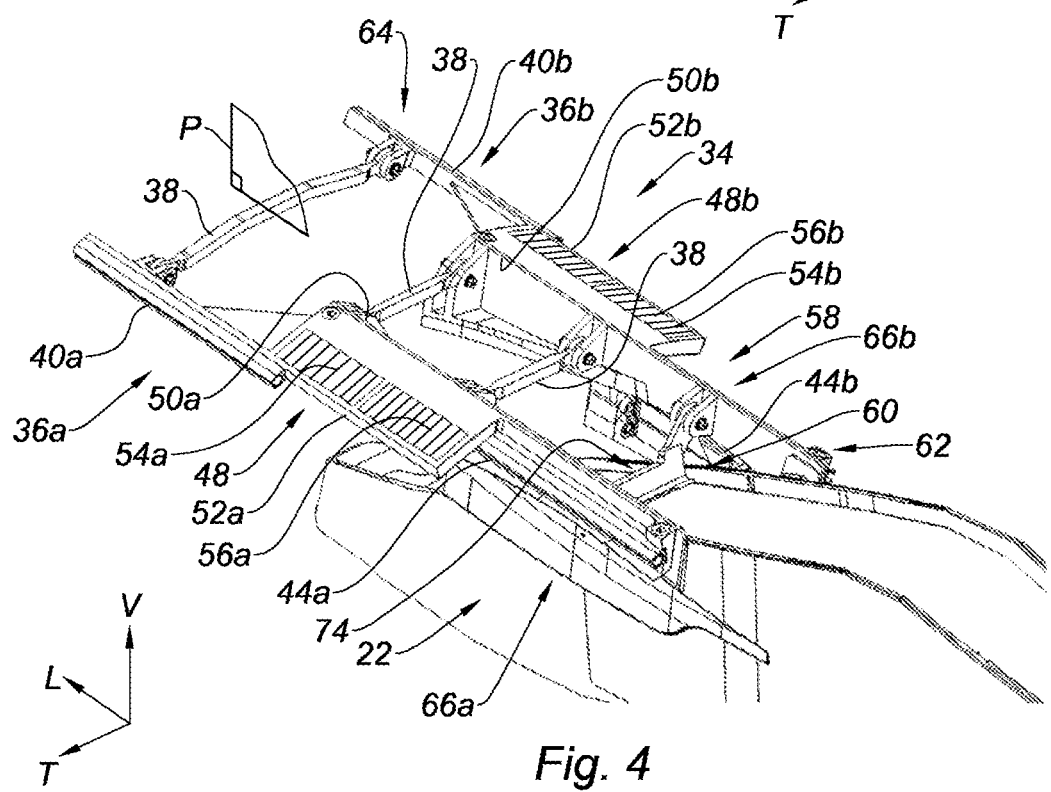
FIG. 4 is a detail perspective view, which illustrates the cradle fastened on the mast according to the teachings of the present disclosure.

In accordance with one form of the present disclosure, the nacelle rear assembly 12 is equipped with a cradle 34, represented in more details in FIG. 4, which has a symmetrical design with respect to a vertical plane of symmetry P passing through the longitudinal axis A of the nacelle 12.

The cradle 34 includes a first longeron 36a and a second longeron 36b which extend longitudinally on either side of the mast 22, and which are linked to each other by three cross members which herein consist of transverse connecting rods 38 designed to provide the transmission of the forces between the two longerons 36a, 36b.

In a non-limiting manner, the connecting rods 38 may be replaced by cross members.

Each connecting rod 38 includes a first pivot linkage mounted in free pivoting on the first longeron 36a about a generally longitudinal axis, and a second pivot linkage mounted in free pivoting on the second longeron 36b about a generally longitudinal axis.

Each of the longerons 36a, 36b includes a sliding guide device of the movable cowl 28 and of the sliding cascades 32.

Figure 3:
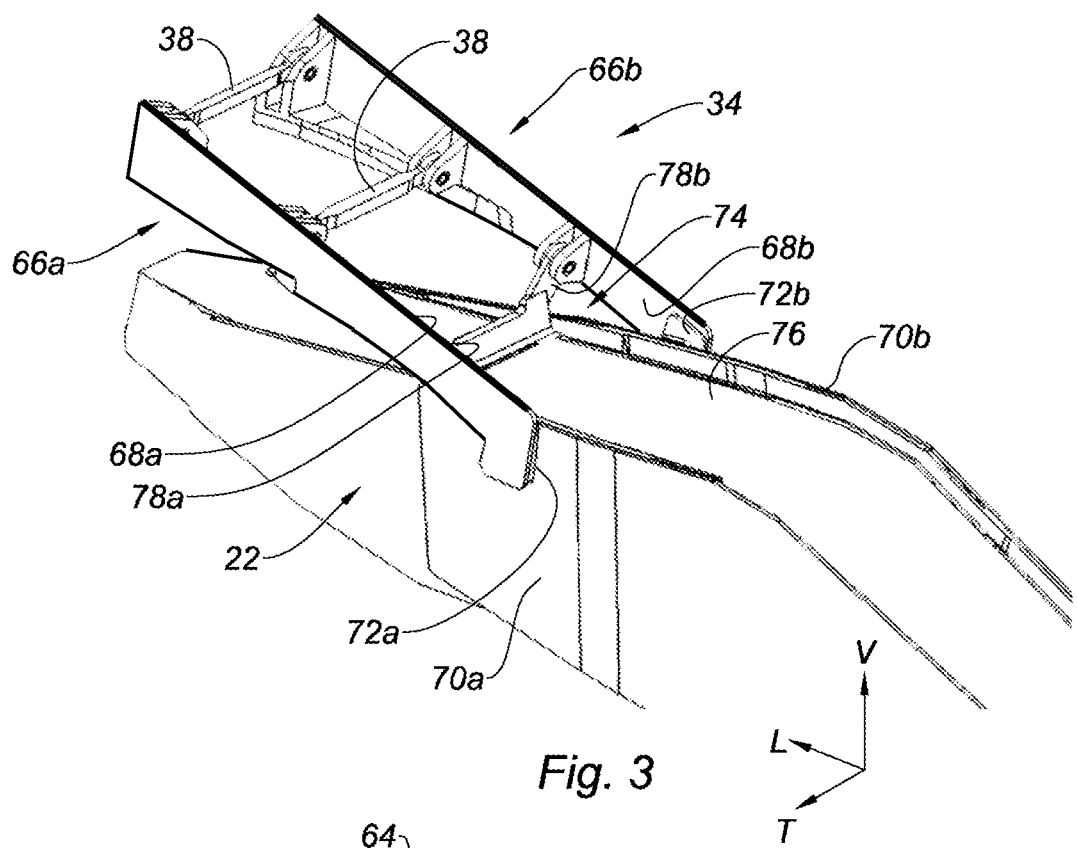
FIG. 3 is a detail perspective view, which illustrates a portion of the cradle fastened on the mast according to the teachings of the present disclosure.

The sliding guide device, represented in detail in FIG. 3, include a first pair of guide rails of the cascades 32 which comprises a first rail 40a and a second rail 40b which extend longitudinally, which are arranged symmetrically with respect to the plane of symmetry P, and which are designed to provide the sliding of the thrust reverser cascades 32.

To this end, referring to FIG. 2, the cascades 32, generally C-shaped annular around the axis A of the nacelle 12, have a first guide edge 42a and a second guide edge 42b which cooperate with the first rail 40a and the second rail 40b respectively.

Furthermore, the sliding guide device include a second pair of guide rails of the cowl 28 which comprises a first rail 44a and a second rail 44b which extend longitudinally, which are arranged symmetrically with respect to the plane of symmetry P, and which are designed to provide the sliding of the movable cowl 28.

To this end, the movable cowl 28, generally C-shaped annular around the axis A of the nacelle 12, has a first guide edge 46a and a second guide edge 46b which cooperate with the first rail 44a and the second rail 44b respectively.

According to another aspect, the first longeron 36a of the cradle 34 includes a first linking portion 48a which is delimited laterally by a first longitudinal edge 50a, and by a second longitudinal edge 52a which carries the first guide rail 40a of the sliding cascades 32.

By symmetry, the second longeron 36b of the cradle 34 includes a second linking portion 48b which is delimited laterally by a first longitudinal edge 50b, and by a second longitudinal edge 52b which carries the second guide rail 40b of the sliding cascades 32.

The guide rails of the cascades 32 are represented in the Figures spaced apart transversely with respect to the guide rails of the cowl 28.

Furthermore, the guide rails of the cascades 32 may also be shifted vertically with respect to the guide rails of the cowl 28.

Nonetheless, when such an arrangement may not be necessary, according to a variant which is not represented, the first rail 40a of the first pair of guide rails of the sliding thrust reverser cascade 32 and the first rail 44a of the second pair of guide rails of the movable cowl 28 are aligned on the same first straight line.

Similarly, by symmetry, the second rail 40b of the first pair of guide rails of the sliding thrust reverser cascade 32 and the second rail 44b of the second pair of guide rails of the movable cowl 28 are aligned on the same second straight line.

Thus, according to this variant, the guide rails of the cascades 32 and the guide rails of the cowl 28 may be made in one-piece part.

Besides, each linking portion 48a, 48b comprises an opening 54a, 54b, illustrated in FIG. 3, which is uncovered by the movable cowl 28 in its opening position, in order to enable the redirection of the air flow.

According to another form, illustrated in FIG. 2, each opening 54a, 54b is equipped with a fixed cascade 56a, 56b, respectively, each cascade including fins designed to redirect the air flow forwardly of the nacelle 12, in order to participate in the thrust reversal, when the movable cowl 28 occupies its opening position.

Advantageously, the fins of the fixed cascades 56a, 56b may be arranged so as to orientate the air flow according to an angle inclined transversely in order to avoid redirecting the air flow towards the wing of the aircraft.

Alternatively, each opening 54a, 54b, or one of the openings 54a, 54b, may be completely or partially obstructed in order to improve the effectiveness of the thrust reverser.

Indeed, by acting on the ejection surface of the openings 54a, 54b, it is possible to act on the ratio between the ejection surface of the nozzle of the propulsion unit and the ejection surface of the passage uncovered by the movable cowl 28 of the thrust reverser. This ratio, which ideally tends towards a unitary value, is known as the "area match".

As visible in FIGS. 3 and 4, the longerons 36a, 36b generally extend longitudinally from the mast 22 forming with the mast 22 an angle of inclination so as to compensate the angle of inclination of the mast 22 plunging towards the core of the turbojet engine, so that the cradle 34 hangs over the mast 22.

A rear portion 58 of the cradle 34 includes a first front fastening device 60 on the mast 22 and a second rear fastening device 62 on the mast 22 which are spaced apart along a longitudinal direction.

Furthermore, the cradle 34 includes a front portion 64, forming a suspension, which extends longitudinally in a cantilevered manner beyond the fastening devices 60, 62 of the cradle 34.

More particularly, the rear portion 58 of the cradle 34 forms a first arm 66a and a second arm 66b which extend vertically and which are delimited by a vertical inner face 68a, 68b respectively bearing on a first sidewall 70a, and a second sidewall 70b of the mast 22.

The rear free end of each arm 66a, 66b, forming the rear fastening device 62 of the cradle 34, is fastened on the mast 22 by a removable screw-nut type fastening (not represented).

Referring to FIG. 3, a first wedge 72a and a second wedge 72b are interposed between the free end of the first arm 66a and of the second arm 66b in order to set the parallelism of the arms and of the guide rails 40a, 40b, 44a, 44b.

The fastening front device 60 of the cradle 34 on the mast 22 is constituted by an anchorage cross member 74 which is fastened on an upper face 76 of the mast 22, for example by a screw-nuts assembly (not represented).

The anchorage cross member 74 is linked at its transverse free ends on the inner face 68a of the first arm 66a and on the inner face 68b of the second arm 66b by a first tie rod 78a and a second tie rod 78b respectively.

Advantageously, the front fastening device 60 and the rear fastening device 62 on the mast 22 are brought close to each other along a longitudinal direction so that the front portion 64 of the cradle is cantilevered and therefore has some flexibility.

This feature allows the cradle 34 to follow the movements of the turbo-compressor and also allows substantially attenuating the movements of the turbo-compressor.

Thus, in the event of a movement of the turbojet engine, in particular in the event of a nose-up, the thrust reverser device 10 generally follows this movement of the turbojet engine.

In particular, this feature allows the sliding cascades 32 and the movable cowl 28, as well as their guide rails 40a, 40b, 44a, 44b to follow the movement of the turbo-compressor.

Advantageously, according to a variant which is not represented, the nacelle 12 includes an inner fixed structure, which surrounds a downstream section of the turbojet engine and which includes islets linked to the cradle 34.

Similarly, according to a variant which is not represented, the thrust reverser device 10 includes safety locks designed to inhibit the unintended deployment of the movable cowl 28.

The present description of the present disclosure is given as a non-limiting example.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A nacelle rear assembly for a turbojet engine comprising a nacelle, at least one thrust reverser device to redirect air flow circulating from upstream to downstream in a flow path of the turbojet engine and a mast to link the nacelle to a structure of an aircraft, the nacelle extending longitudinally from forth to back along an axis, the thrust reverser device comprising:
at least one movable cowl movably mounted in longitudinal translation from forth to back along a direction substantially parallel to the axis of the nacelle, between a closure position that provides an aerodynamic continuity of the nacelle and an opening position that opens a passage in the nacelle; and
at least one sliding thrust reverser cascade driven by the at least one movable cowl, between a stowed position between a fan casing and an external envelope of the nacelle, corresponding to the closure position of the at least one movable cowl, and a thrust reversal position corresponding to the opening position of the at least one movable cowl, in which position the at least one sliding thrust reverser cascade is displaced downstream so as to be able to extend through said passage opened by the at least one movable cowl,
wherein the nacelle rear assembly is equipped with a cradle which is fastened on the mast and which includes a first longeron and a second longeron generally extending longitudinally along a first and a second longitudinal axis, respectively, on either side of the mast, each of said longerons carrying a sliding guide device of the at least one movable cowl and of the at least one sliding thrust reverser cascade, wherein a rear portion of the cradle includes a first front fastening device on the mast and a second rear fastening device on the mast, said first and second fastening devices being spaced apart longitudinally, and wherein the cradle includes a front portion forming a suspension that extends longitudinally in a cantilevered manner beyond the front and rear fastening devices.

2. The nacelle rear assembly according to claim 1, wherein the mast includes a front section linked to a core of a turbo-compressor by a first suspension.

3. The nacelle rear assembly according to claim 2, wherein the first and second longerons extend longitudinally forward from the mast, forming with the mast an angle of inclination so as to compensate an angle of inclination of the mast plunging towards the core of the turbojet engine, so that at least one region of the cradle hangs over the mast.

4. The nacelle rear assembly according to claim 1 further comprising at least one transverse cross member which links the first longeron and the second longeron of the cradle transversely to each other and which is configured to provide transmission of forces between the first and second longerons.

5. The rear assembly of a nacelle according to claim 4, wherein the at least one transverse cross member is a connecting rod comprising:
a first pivot linkage mounted in free pivoting on the first longeron about the first longitudinal axis; and
a second pivot linkage mounted in free pivoting on the second longeron about the second longitudinal axis.

6. The nacelle rear assembly according to claim 1 further comprising:
one first pair of guide rails of the at least one sliding thrust reverser cascade, comprising a first rail and a second rail which are arranged on either side of the mast and which are configured to provide sliding of the at least one sliding thrust reverser cascade; and
one second pair of guide rails of the at least one movable cowl, comprising a first rail and a second rail which are arranged on either side of the mast and which are configured to provide sliding of the at least one movable cowl.

7. The nacelle rear assembly according to claim 6, wherein the first longeron of the cradle further includes a first linking portion delimited laterally by a first longitudinal edge that extends in the vicinity of the mast and by a second longitudinal edge which carries at least the first rail of the first pair of guide rails of the at least one sliding thrust reverser cascade; and the second longeron of the cradle further includes a second linking portion delimited laterally by a first longitudinal edge which extends in the vicinity of the mast, and by a second longitudinal edge which carries at least the second rail of the first pair of guide rails of the at least one sliding thrust reverser cascade.

8. The nacelle rear assembly according to claim 7, wherein the first and second linking portions each comprises an opening uncovered by the at least one movable cowl in the opening position to allow redirection of air flow.

9. The nacelle rear assembly according to claim 8, wherein each of the openings is adapted to be at least one of completely obstructed or partially obstructed.

10. The nacelle rear assembly according to claim 1 further comprising an inner fixed structure having islets linked to the cradle.

11. The nacelle rear assembly according to claim 1, wherein the at least one thrust reverser device further includes at least one safety lock.

* * * * *